(12) United States Patent
Florez

(10) Patent No.: US 8,577,798 B2
(45) Date of Patent: *Nov. 5, 2013

(54) CONSULAR KIOSKS AND METHODS

(75) Inventor: Miguel Florez, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,573

(22) Filed: Jun. 20, 2012

(65) Prior Publication Data

US 2013/0103516 A1    Apr. 25, 2013

Related U.S. Application Data

(63) Continuation of application No. 12/392,959, filed on Feb. 25, 2009, now Pat. No. 8,225,987.

(51) Int. Cl.
*G06Q 40/00*     (2012.01)
*G06Q 20/10*     (2012.01)
*G06Q 20/18*     (2012.01)

(52) U.S. Cl.
CPC ............ *G06Q 40/00* (2013.01); *G06Q 20/10* (2013.01); *G06Q 20/18* (2013.01)
USPC ........................................ 705/39; 235/380

(58) Field of Classification Search
CPC ........ G06Q 40/00; G06Q 20/10; G06Q 20/18
USPC ............................................ 705/39; 235/380
See application file for complete search history.

(56) References Cited

U.S. PATENT DOCUMENTS

| 6,085,976 | A  | * | 7/2000  | Sehr .............................. 235/384 |
| 6,845,364 | B1 |   | 1/2005  | Pool et al. |
| 7,302,115 | B2 |   | 11/2007 | Fredlund et al. |
| 8,225,987 | B2 |   | 7/2012  | Florez |
| 2005/0167484 | A1 | * | 8/2005 | Sussman ........................ 235/380 |
| 2009/0037808 | A1 |   | 2/2009 | Thibodeau |
| 2010/0217704 | A1 |   | 8/2010 | Florez |
| 2011/0145053 | A1 | * | 6/2011 | Hashim-Waris ........... 705/14.35 |

OTHER PUBLICATIONS

Cohen, A. (2004). Travelers entering U.S. face security hurdles. Business Travel News, 21(2), 37. Retrieved Jun. 21, 2013.*
International Search Report and Written Report of PCT/US2010/025039 mailed on Apr. 15, 2010, 8 pages.
Riyasbabu, "Visas on Mobile Phones in Dubai." McClatchy-Tribune Business News, Jan. 14, 2009, [retrieved on Mar. 6, '2012], 2 pages. Retrieved from proquest.umi.com.

\* cited by examiner

*Primary Examiner* — Kito R Robinson
(74) *Attorney, Agent, or Firm* — Kilpatrick Townsend & Stockton LLP

(57) ABSTRACT

Embodiments of the invention provide a method of implementing electronic transfers with government consulates. The method may include receiving, via the interface terminal, a selection of a country's consulate and a location of the consulate comprising a city in which the consulate has an office. The method may also include receiving, via the interface terminal, a consulate service selection. The method may further include receiving, at an input device, documentation necessary to complete the selected service type. The method may moreover include receiving, via the interface terminal, a payment for the selected service. The method may additionally include transmitting the service type selection, the documents, and the payment to the selected consulate.

26 Claims, 5 Drawing Sheets

CONSULAR KIOSKS AND METHODS

PRIORITY CLAIM

This application is a continuation of U.S. patent application Ser. No. 12/392,959, now U.S. Pat. No. 8,225,987, entitled "CONSULAR KIOSKS AND METHODS", issued Jul. 24, 2012, filed on Feb. 25, 2009, which is incorporated by reference, in its entirety, for any and all purposes, as if fully set forth herein.

FIELD OF THE INVENTION

The present invention relates, in general, to electronic transactions, and more particularly, to electronic transfers to and from government consulates.

BACKGROUND OF THE INVENTION

Currently, in order to interact with government consulates to obtain documents, report vital occurrences (e.g., deaths, births, marriages, etc.), among other services, a customer must execute all transactions manually in paper form, and pay any fees and/or costs with a check or money order. As such, interacting with consulates is time-consuming, labor intensive, slow, and provides for limited payment options. Accordingly, improvements in the art are needed.

BRIEF SUMMARY OF THE INVENTION

The present invention provides a method for implementing electronic transfers with government consulates. The method includes presenting an interface terminal to a customer. The interface terminal is configured to receive input from the customer. Further, the method includes receiving, via the interface terminal, a selection of a country's consulate. The method further includes receiving, via the interface terminal, a consulate service type selection, and receiving, at an input device, documentation necessary to complete the selected service type. Furthermore, the method includes receiving, via the interface terminal, a payment for the selected service, and transmitting to the selected country's consulate the service type selection, the documents, and the payment.

An alternative embodiment provides a system for implementing electronic transfers with government consulates. The system includes a kiosk having a terminal interface. The terminal interface is configured to receive input from the customer, receive a selection of a country's consulate, receive a consulate service type selection, and receive a payment for the selected service. The kiosk further has a dynamic scanner configured to scan documentation necessary to complete the selected service type, and a communications device configured to transmit the selected country's consulate the service type selection, the documents, and the payment to the selected consulate.

The system further includes a transaction processor in communication with the kiosk via the communications device. The transaction processor is configured to receive the service type selection, the documents, and the payment from the kiosk, and transmit a service request. The system also includes a consulate system in communication with the transaction processor. The consulate system configured to receive and process the service request.

A further embodiment provides a machine-readable medium for implementing electronic transfers with government consulates. The machine-readable medium includes instructions for presenting an interface terminal to a customer. The interface terminal is configured to receive input from the customer. Further, the machine-readable medium includes instructions for receiving, via the interface terminal, a selection of a country's consulate. The machine-readable medium further includes instructions for receiving, via the interface terminal, a consulate service type selection, and instructions for receiving, at an input device, documentation necessary to complete the selected service type. Furthermore, the machine-readable medium includes instructions for receiving, via the interface terminal, a payment for the selected service, and instructions for transmitting to the selected country's consulate the service type selection, the documents, and the payment.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Aspects of the present invention relate to providing electronic document and funds transfer to and from government consulate offices. Such a method and system provide customers with the ability to easily scan multiple documents of various size and shape as well as the ability to pay for services rendered from a variety of sources. Furthermore, all required documents are able to be transmitted to the consulate office in a single file/transaction. Hence, the process of receiving services from consulate offices is stream-lined and simplified.

Figure 1:
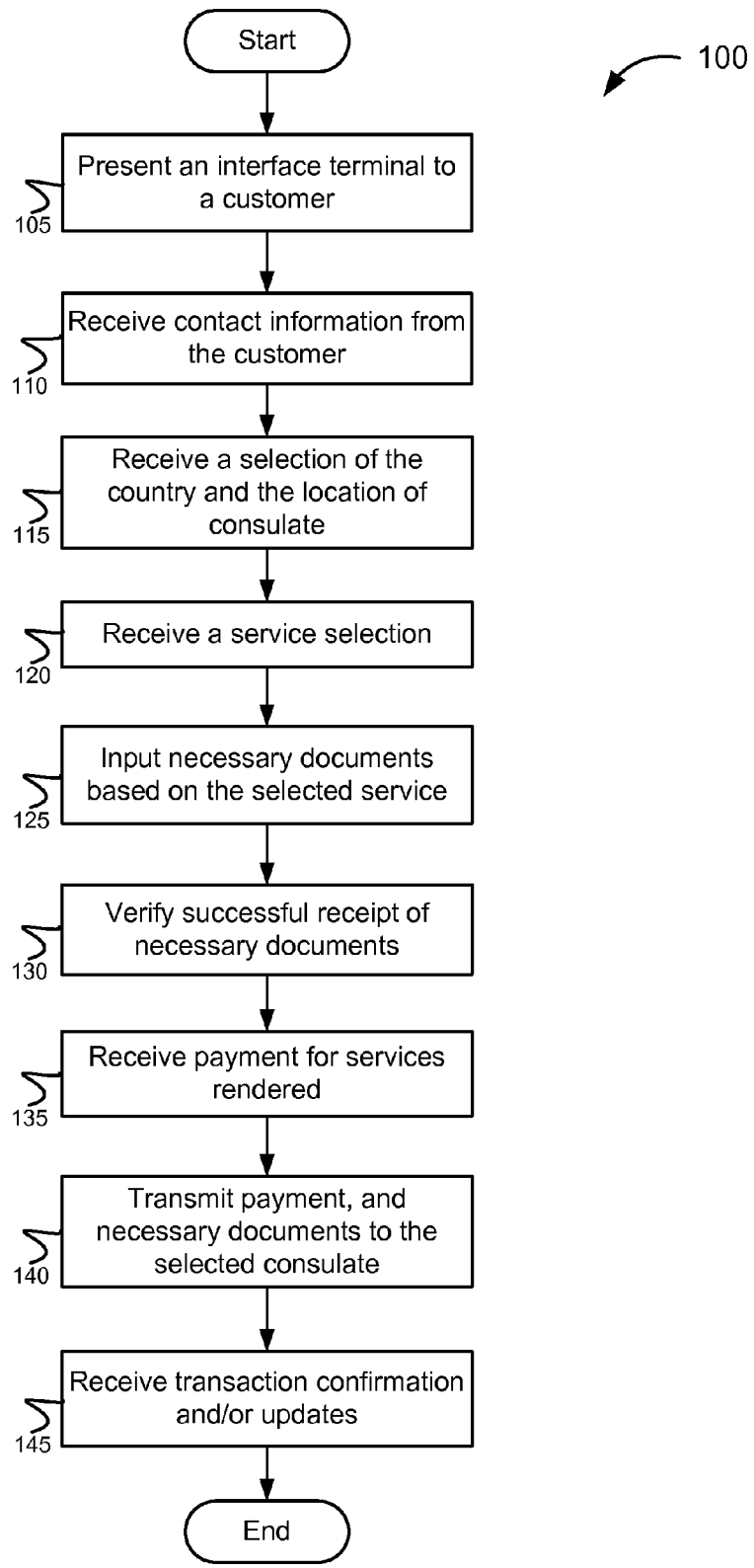
FIG. 1 is a flow diagram illustrating a method of implementing electronic transfers to and from government consulates, according to one embodiment of the present invention.

Turning now to FIG. 1, a flow diagram illustrates a method 100 of implementing electronic transfers to and from government consulates, according to one embodiment of the present invention. At process block 105, a terminal interface is presented to a customer. In one embodiment, the terminal interface may be located in a kiosk machine. Alternatively, the terminal interface may be at an automated teller machine (ATM), a personal computer, a branch location, via a web interface, etc. Furthermore, the terminal interface may be a touch screen which allows the customer to interact directly with the screen. Alternatively, the terminal interface may be a display screen with a mouse, a keyboard, a touchpad, etc. used to interact with the terminal interface.

In addition, the terminal interface may present with customer with various options which the customer may select from. In one embodiment, the customer may be given the option of entering in personal contact information (process block 110). For example, the customer may enter their name, address, phone number, email address, nationality, etc. and the customer may also be able to create a user profile with a username and password. As such, once the customer logs in, the customer's information will automatically be populated. Further, the customer's transaction history may be stored and displayed to the customer at login. Thus, common transactions may be easily located and resubmitted, modified, tracked, etc.

At process block 115, a selection of the country of the consulate and the location of the consulate may be received. For example, the terminal interface may present the customer with the option of either searching for a country by name, or alternatively listing all countries serviced at the kiosk, and allowing the customer to select their desired country. Furthermore, once the customer has selected the country, the location of the consulate may also be selected. For example, the customer may select the French consulate and all of the locations of the French consulate may be displayed (e.g., the Los Angeles location, the New York location, the Denver location, etc.), and then the customer can select the desired location by, for example, touching the location on the touch screen terminal interface.

At process block 120, the customer may select the desired consulate service. For example, once the consulate has been selected, the terminal interface may display all of the possible services offered by that consulate. Some services may be, for example, registering a new birth, registering a death, requesting a birth certificate, or requesting a passport or other official documents. It should be apparent that services may be offered additional to those listed, and that each consulate will offer a different set of services based on their government structure, etc.

Furthermore, at process block 125, the necessary documents may be input into the kiosk as required by the consulate for the desired service. For example, in order to report a new birth, the consulate may require the parent's passport and an official doctor's report of the birth. As such, the customer may insert these documents into the kiosk so that they may be transmitted to the consulate. In one embodiment, a dynamic scanner may be attached to the kiosk or in the housing of the kiosk to receive and scan the documents. In one embodiment, the scanner may be able to adapt to the size, shape, texture, thickness, etc. of the document to be scanned. Hence, the scanner would be a dynamic scanner.

At process block 130, verification of the successful inputting of the documents may be received. For example, as the documents are scanned, the terminal interface may display the scanned documents for viewing by the customer. The customer may then be able to visually verify that the document scanned correctly. Alternatively, the scanned document may be compared against a control document of the same document type in order to verify that the document scanned correctly. A database of control documents for each document type and each consulate may be stored in a storage device in the kiosk or available to the kiosk.

After the necessary documents have been properly scanned and any additional information has been inputted by the customer, payment for the service(s) may be presented (process block 135). In one embodiment, payment may be made using, for example, cash, check, money order, credit, debit, electronic funds transfer, wire transfer, money transfer, e-wallet, e-currency, etc. The ability to pay for the consulate services using alternative payment methods other than check or money order provides a significant benefit to customers, because presently consulates only accept check or money orders.

Once the necessary documents, additional information, and funds have been inputted into the kiosk, they are then transmitted to the selected consulate (process block 140). Alternatively, these items may be transmitted to a processing agent, and then the processing agent may forward the items to the selected consulate. Either way, once the consulate receives the scanned documents, the additional information, and the payment funds, the request may then be processed.

At process block 145, the customer may receive a transaction confirmation from the consulate directly or through the processing agent. Additionally, an update may be received as the process of filling the request is performed by the consulate. For example, the customer may receive emails, SMS text messages, voicemails, paper mail, etc. indicating confirmation of the transaction or updated information about the transaction.

Figure 2A:
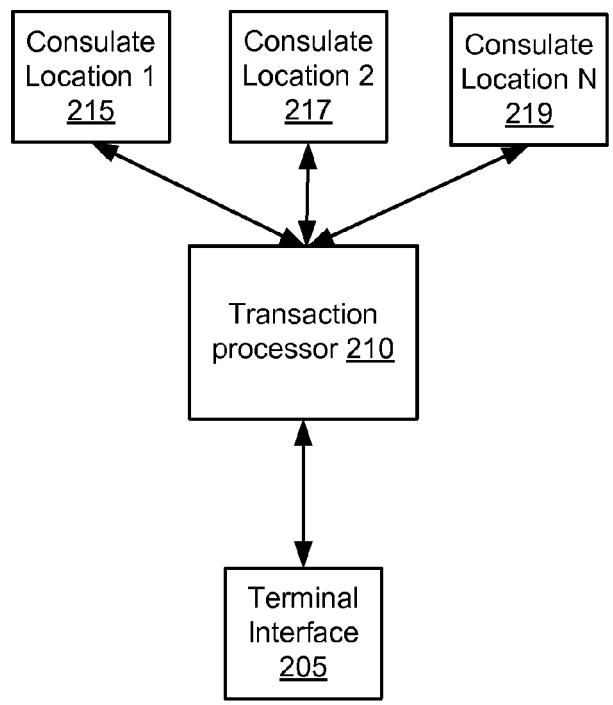
FIGS. 2A and 2B are block diagrams illustrating systems for implementing electronic transfers to and from government consulates, according to one embodiment of the present invention.

Turning next to FIG. 2A, a block diagram illustrates a system for implementing electronic transfers to and from government consulates, according to one embodiment of the present invention. The system may include a terminal interface 205 connected with a transaction processor 210 and multiple consulate locations (1, 2, N) 215, 217, and 219 connected with transaction processor 210. In one embodiment, terminal interface 205 may be the terminal interface described above in FIG. 1. Likewise, transaction processor 210 may be the processing agent as described in FIG. 1, and consulate locations 215, 217, and 219 may be the consulate location described in FIG. 1.

In a further embodiment, terminal interface 205 may be implemented in a kiosk and be configured to provide a customer with the consulate services as described in FIG. 1. Service options may be presented to the customer at terminal interface 205, and the service selection may be transmitted to transaction processor 210 to be processed. Furthermore, a scanning device may be located at terminal interface 205 in order to receive the necessary documents for the service to be rendered. Further, transaction processor 210 may then forward the request and documents to the selected consulate location (i.e., one of consulate locations 215, 217, or 219). Accordingly, the selected consulate location 215, 217, or 219 may then transmit confirmation of the service request and/or updates concerning the request to either transaction processor 210, terminal interface 205, or the customer.

Furthermore, transaction processor 210 may be configured to charge a fee for processing the consulate service request for the customer. For example, the customer may be charged a flat fee for the service, a per document fee, a per service fee, a percentage of the fee charged by the consulate for the service, etc. Additionally, the consulate may also be charged by transaction processor 210 in the same or in a similar fashion.

Figure 2B:
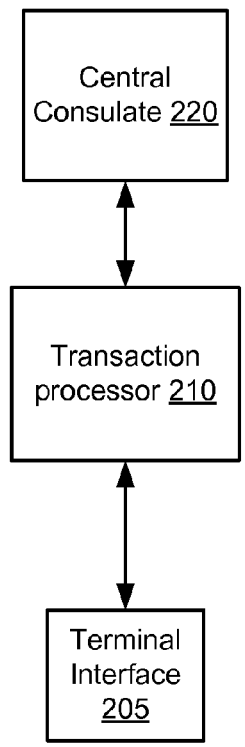

Alternatively, in FIG. 2B, the system includes a central consulate 220 as opposed to individual consulate locations 215, 217, and 219. In this configuration instead of transaction processor 210 interacting with individual consulate locations, all transactions and/or requests go to a central location, which can save the consulate's country time and money.

Figure 3:
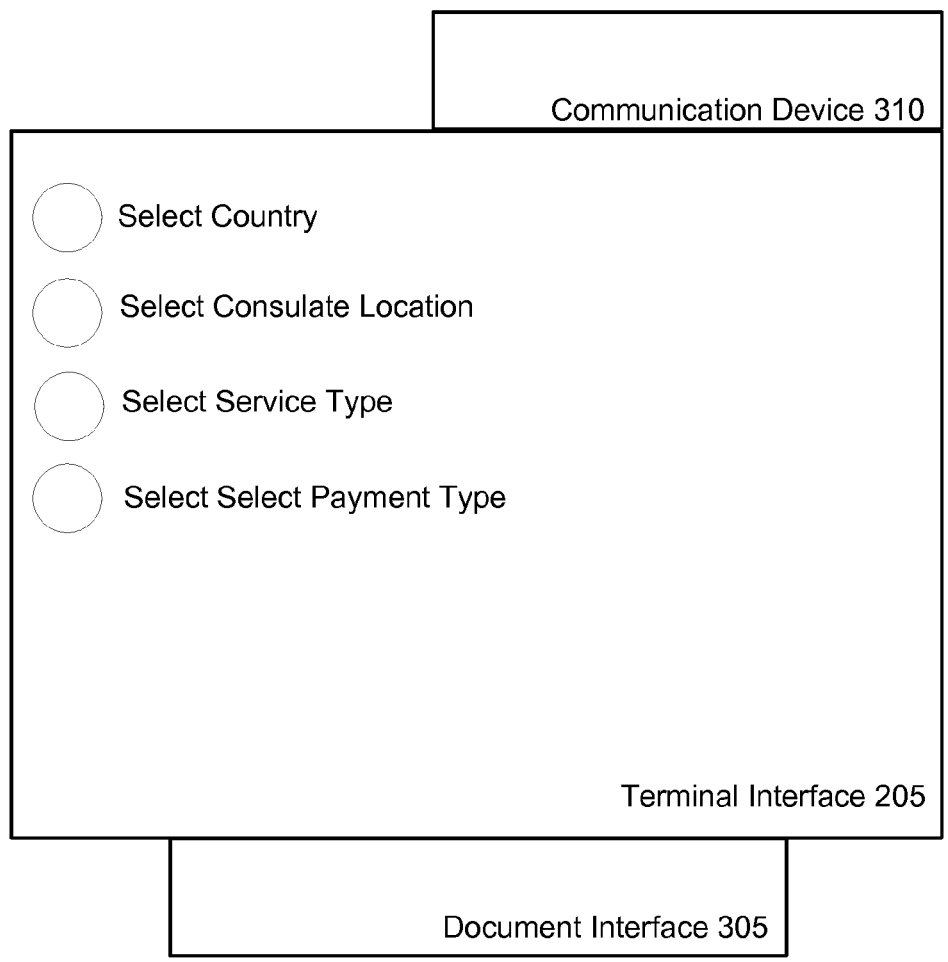
FIG. 3 is a block diagram illustrating an interface device for facilitating electronic transfers to and from government consulates, according to one embodiment of the present invention.

Referring next to FIG. 3, the figure illustrates one embodiment of terminal interface 205 configured to facilitate electronic transfers to and from government consulates. Terminal interface 205 may include a document interface 305 and a communication device 310. Document interface 305 may be configured to receive and scan the necessary documents for the selected service. Document interface 305 may dynamically change its size and/or shape to accommodate the document being inputted, such that no matter the size, shape, texture, thickness, material, etc., document interface 305 is able to scan the document.

In addition, communications device 310 may be in communication with transaction processor 210 and/or consulates 215, 217, and 219, or central consulate 220. Communications device 310 may be, for example, a Wi-Fi device, a cellular device, a modem, a Bluetooth adapter, a wireless radio, a network interface card (NIC), a USB adapter, etc. Accordingly, documents, payment funds, and other information necessary to render the requested service may be transmitted using communication device 310 to transaction processor 210 and/or consulates 215, 217, and 219, or central consulate 220.

Figure 4:
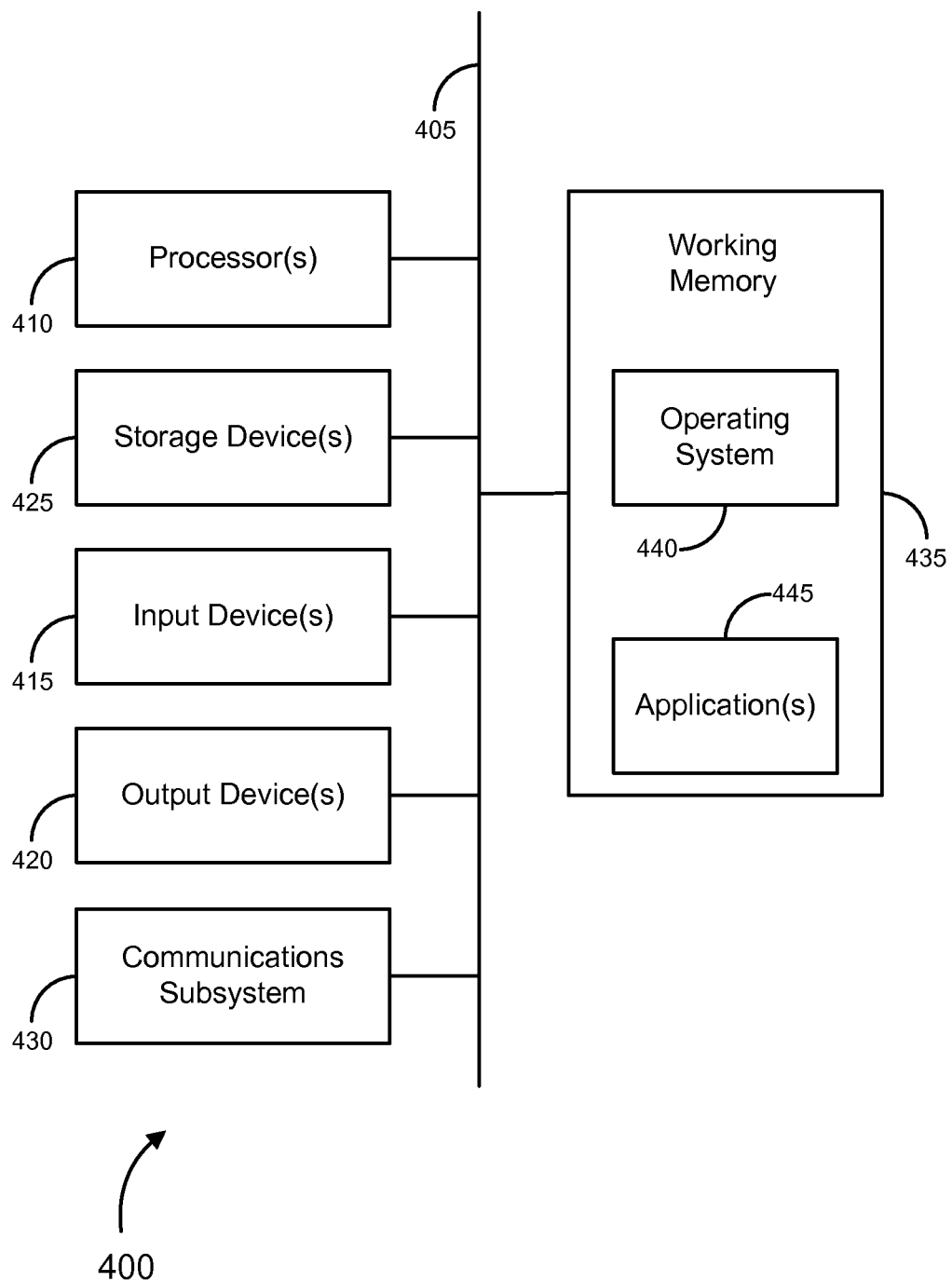
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, transaction processor 210 (FIGS. 2A and 2B). It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including, without limitation, one or more general purpose processors and/or one or more special purpose processors (such as digital signal processing chips, graphics acceleration chips, and/or the like); one or more input devices 415, which can include, without limitation, a mouse, a numeric keypad, a keyboard, a touch screen, and/or the like; and one or more output devices 420, which can include, without limitation, a display device, a printer, a sound card and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, mesh network, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 can also comprise software elements, shown as being currently located within the working memory 435, including an operating system 440 and/or other code, such as one or more application programs 445 or Application Programming Interfaces (APIs), which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 425 described above. In some cases, the storage medium might be incorporated within a computer system, such as the system 400. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
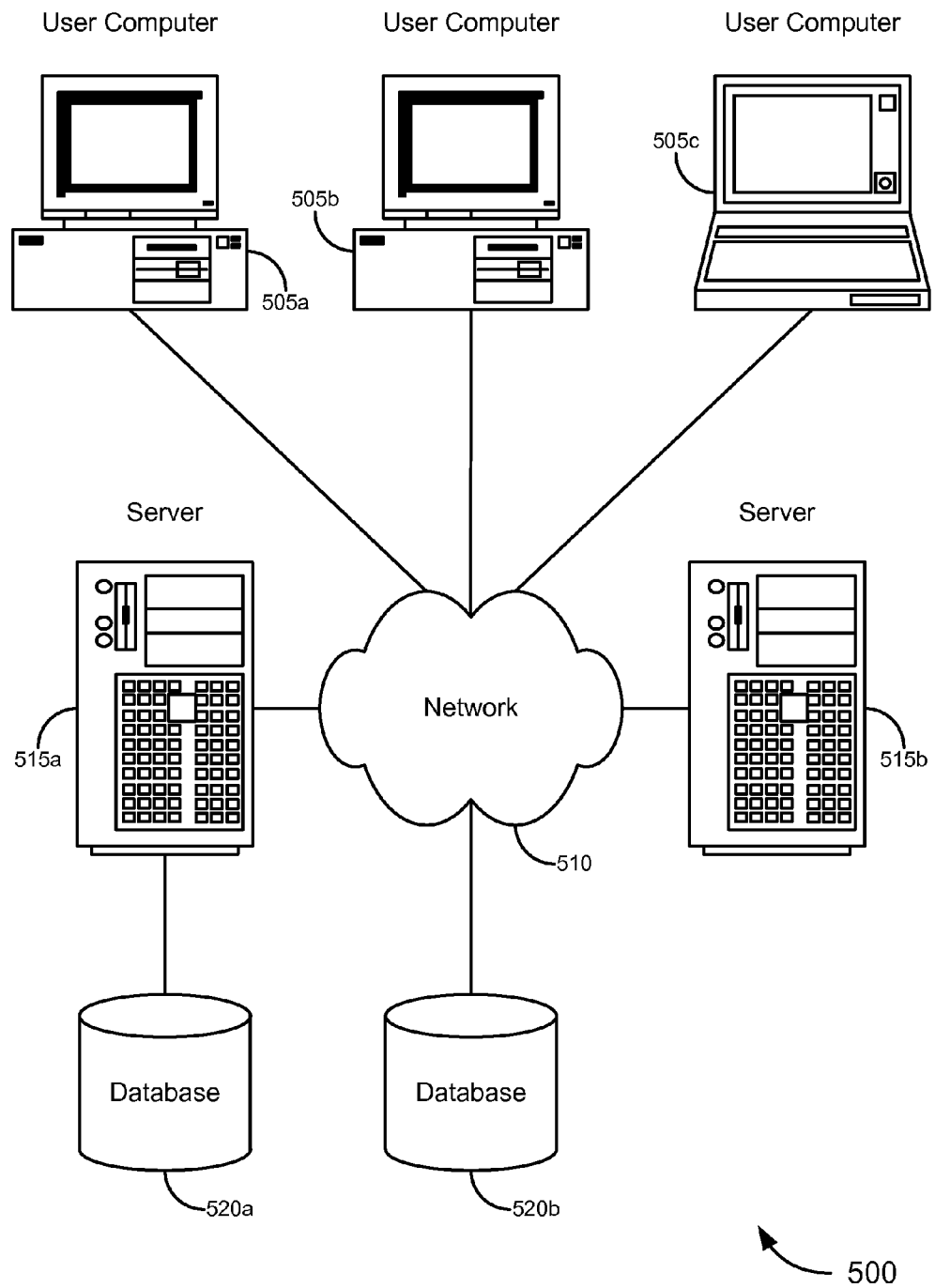
FIG. 5 is a block diagram illustrating a networked system of computers, which can be used in accordance with various embodiments of the invention.

A set of embodiments comprises systems for implementing location-based money transfers. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially available UNIX™ or UNIX-like operating systems. These user computers 505 can also have any of a variety of applications, including one or more applications configured to perform methods of the invention, as well as one or more office applications, database client and/or server applications, and/or web browser applications. Alternatively, the user computers 505 can be any other electronic device, such as a thin-client computer, cellular telephone, Internet-enabled mobile telephone, and/or personal digital assistant (PDA), capable of communicating via a network (e.g., the network 510 described below) and/or displaying and/or navigating web pages or other types of electronic documents. Although the exemplary system 500 is shown with three user computers 505, any number of user computers can be supported.

Certain embodiments of the invention may operate in a networked environment, which can include a network 510. The network 510 can be any type of network familiar to those skilled in the art that can support data communications using any of a variety of commercially available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, mesh network, Code Division Multiple Access (CDMA), Time Division Multiple Access (TDMA), Global System for Mobile communications (GSM), General Packet Radio Service (GPRS), the Bluetooth™ protocol known in the art, and/or any other wireless protocol; and/or any combination of these and/or other networks.

Embodiments of the invention can include one or more server computers 515 or mainframe computers. Each of the server computers 515 may be configured with an operating system, including without limitation any of those discussed above, as well as any commercially (or freely) available server operating systems. Each of the servers 515 may also be running one or more applications, which can be configured to provide services to one or more user computers 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention. Data provided by an application server may be formatted as web pages (comprising HTML, Javascript, WML, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server or mainframe computer and/or a plurality of specialized servers or mainframe computers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer-implemented method of implementing electronic transfers with government consulates, the method comprising:
   receiving, via an interface terminal, a selection of a country's consulate and a location of the consulate comprising a city in which the consulate has an office;
   receiving, via the interface terminal, a consulate service selection;
   receiving, at an input device, documentation necessary to complete the selected service type;
   receiving, via the interface terminal, a payment for the selected service; and
   transmitting the service type selection, the documents, and the payment to the selected consulate.

2. The computer-implemented method of implementing electronic transfers with government consulates according to claim 1, further comprising processing, by the country's consulate, the service selection.

3. The computer-implemented method of implementing electronic transfers with government consulates according to claim 1, further comprising receiving, via the interface terminal, contact information for a customer.

4. The computer-implemented method of implementing electronic transfers with government consulates according to claim 3, wherein the contact information comprises a selection from a group consisting of: the customer's name, the customer's address, the customer's telephone number, and the customer's email address.

5. The computer-implemented method of implementing electronic transfers with government consulates according to claim 4, further comprising transmitting a confirmation of the selected service to the customer.

6. The computer-implemented method of implementing electronic transfers with government consulates according to claim 5, wherein the confirmation is transmitted to the customer using a selection from a group consisting of: a voice mail, an email, an SMS text, and a mailed document.

7. The computer-implemented method of implementing electronic transfers with government consulates according to claim 1, wherein the input device is a dynamic scanning device.

8. The computer-implemented method of implementing electronic transfers with government consulates according to claim 7, wherein the dynamic scanning device is configured to adapt to at least one of the document's size, shape, texture, color, or thickness when scanning the document.

9. The computer-implemented method of implementing electronic transfers with government consulates according to claim 8, wherein the document includes a selection from a group consisting of: a birth certificate, a death certificate, a passport, a marriage certificate, a driver's license, and a government ID.

10. The computer-implemented method of implementing electronic transfers with government consulates according to claim 9, further comprising displaying, on a display device, each document as the document is successfully scanned by the dynamic scanner.

11. The computer-implemented method of implementing electronic transfers with government consulates according to claim 1, further comprising receiving, from the selected consulate, verification of the success of the selected service.

12. The computer-implemented method of implementing electronic transfers with government consulates according to claim 1, wherein the payment includes a payment type.

13. The computer-implemented method of implementing electronic transfers with government consulates according to claim 12, wherein the payment type includes a selection from a group consisting of: check, money transfer, wire transfer, cash, money order, electronic funds transfer, credit, debit, e-wallet, and e-currency.

14. The computer-implemented method of implementing electronic transfers with government consulates according to claim 1, wherein the service selection comprises a selection from a group consisting of:
 registering a birth;
 registering a death;
 requesting a birth certificate;
 requesting a death certificate;
 requesting a passport; and
 requesting an official document.

15. The computer-implemented method of implementing electronic transfers with government consulates according to claim 1, wherein the method further comprises:
 transmitting, from the selected consulate to a customer, an update including a selection from a group consisting of:
  confirmation of a transaction related to the service selection; and
  updated information about the transaction related to the service selection.

16. A system for implementing electronic transfers with government consulates, the system comprising:
 a kiosk having:
  a terminal interface configured to:
   receive a selection of a country's consulate,
   present a list of different cities in which the consulate has offices,
   receive a selection of a city from the list of different cities,
   receive a service selection, and
   receive a payment for the selected service;
  a communications device configured to transmit to the selected country's consulate the service selection and the payment.
 a transaction processor in communication with the kiosk via the communications device, the transaction processor configured to receive the service selection and the payment from the kiosk, and transmit a service request; and
 a consulate system in communication with the transaction processor, the consulate system configured to receive and process the service request.

17. The system for implementing electronic transfers with government consulates according to claim 16, wherein the kiosk also includes a dynamic scanner configured to adaptively change shape in order to accommodate the scanned documents' size, shape, texture, or thickness.

18. The system for implementing electronic transfers with government consulates according to claim 16, wherein the communications device comprises a selection from a group consisting of: a wireless radio, a network interface card (NIC), a Bluetooth adapter, a USB adapter, and a modem.

19. The system for implementing electronic transfers with government consulates according to claim 16, wherein the payment includes a payment type and the payment type includes a selection from a group consisting of: check, money transfer, wire transfer, cash, money order, electronic funds transfer, credit, debit, e-wallet, and e-currency.

20. The system for implementing electronic transfers with government consulates according to claim 16, wherein the terminal interface is further configured to:
 determine the list of different cities in which the consulate has offices based on the selection of the country's consulate.

21. The system for implementing electronic transfers with government consulates according to claim 16, wherein the service selection comprises a selection from a group consisting of:
 registering a birth;
 registering a death;
 requesting a birth certificate;
 requesting a death certificate;
 requesting a passport; and
 requesting an official document.

22. The system for implementing electronic transfers with government consulates according to claim 16, wherein the consulate system is further configure to:
 transmit, to a customer, an update including a selection from a group consisting of:
  confirmation of a transaction related to the service selection; and
  updated information about the transaction related to the service selection.

23. A tangible non-transitory machine-readable medium for implementing electronic transfers with government consulates, having sets of instructions stored thereon which, when executed by a machine, cause the machine to:
 receive, via an interface terminal, a selection of a country's consulate and a selection of a specific location of a physical location of one of the consulate offices;
 receive, via the interface terminal, a consulate service selection;
 receive, via the interface terminal, a payment for the selected service; and
 transmit the service type selection and the payment to the selected consulate.

24. The machine-readable medium for implementing electronic transfers with government consulates according to claim 23, wherein the instructions further cause the machine to:
 determine the list of different cities in which the consulate has offices based on the selection of the country's consulate.

25. The machine-readable medium for implementing electronic transfers with government consulates according to claim 23, wherein the service selection comprises a selection from a group consisting of:
 registering a birth;
 registering a death;
 requesting a birth certificate;
 requesting a death certificate;
 requesting a passport; and
 requesting an official document.

26. The machine-readable medium for implementing electronic transfers with government consulates according to claim 23, wherein the instructions further cause the machine to:
 transmit, from the selected consulate to a customer, an update including a selection from a group consisting of:
  confirmation of a transaction related to the service selection; and
  updated information about the transaction related to the service selection.

* * * * *